US006350050B1

United States Patent
Buelow, II et al.

(10) Patent No.: US 6,350,050 B1
(45) Date of Patent: Feb. 26, 2002

(54) EFFICIENT FIBEROPTIC DIRECTIONAL LIGHTING SYSTEM

(75) Inventors: Roger F. Buelow, II, Cleveland Heights; John M. Davenport, Lyndhurst; Juris Sulcs, Chagrin Falls, all of OH (US)

(73) Assignee: Fiberstars Incorporated, Fremont, CA (US)

(*) Notice: Subject to any disclaimer, the term of this patent is extended or adjusted under 35 U.S.C. 154(b) by 0 days.

(21) Appl. No.: 09/565,258

(22) Filed: May 5, 2000

Related U.S. Application Data

(63) Continuation-in-part of application No. 09/561,365, filed on Apr. 28, 2000.

(51) Int. Cl.$^7$ ................................................. F21V 8/00
(52) U.S. Cl. ...................... 362/551; 362/558; 362/580; 362/581; 362/554; 362/556; 362/582; 385/15; 385/48
(58) Field of Search ................................. 362/558, 580, 362/581, 554, 556, 582; 385/15, 48

(56) References Cited

U.S. PATENT DOCUMENTS 5,791,756 A * 8/1998 Hulse et al. ................. 362/32
5,812,713 A * 9/1998 Allen et al. ................. 385/39

FOREIGN PATENT DOCUMENTS

DE 2738050 * 3/1979 .................. 385/45
DE 2843971 * 4/1980 .................. 385/45

OTHER PUBLICATIONS

"Optical Branch for Optical Data Distribution", Transactions of the IECE of Japan vol. E 60, No.3 Mar. 1977.*

* cited by examiner

Primary Examiner—Stephen Husar
Assistant Examiner—Anabel Ton
(74) Attorney, Agent, or Firm—Charles E. Bruzga

(57) ABSTRACT

An efficient downlight system for directing light includes a light source and a generally tubular, hollow coupling device with an interior light-reflective surface for receiving light from the source at an inlet and transmitting it as a generally diverging light beam through an outlet. The coupling device is shaped in accordance with non-imaging optics and increases in cross sectional area from inlet to outlet in such manner as to reduce the angle of light reflected from the surface as it passes through the device. A thermal-isolating region has an inlet positioned in proximity to an outlet of the coupling device and has an outlet for passing light to an optical member. An arrangement for splitting the light from the outlet of the thermal-isolating region comprises a plurality of light guides. Each light guide includes an inlet end for receiving light from the thermal-isolating region and an outlet end for directing light to a remote location. The inlet ends are substantially coplanar with each other and form a substantially solid shape. The coupling device and thermal-isolating region are shaped so as to distribute a respective, substantial (i.e., useful) amount of light to each of the plurality of light guides. Efficiencies of about 30 lumens per watt may be achieved.

25 Claims, 6 Drawing Sheets

1

EFFICIENT FIBEROPTIC DIRECTIONAL LIGHTING SYSTEM

This is a continuation-in-part of application Ser. No. 09/561,365; filed on Apr. 28, 2000 for "Efficient Fiberoptic Directional Lighting System," by the Roger F. Buelow II, John M. Davenport and Juris Sucls, the same inventors as for this application.

FIELD OF THE INVENTION

The present invention relates to an optical system including an arrangement for splitting light into a plurality of light guides for directing light, e.g., downwardly from a ceiling fixture.

BACKGROUND OF THE INVENTION

Fiberoptic systems offer many advantages over conventional electric lighting directional lighting systems. These include delivery of light without the heat generated by the light source, the absence of ultraviolet light, controllability, the use of simple and compact lighting fixtures, the absence of electrical wiring at the lighting point, increased life, etc. Unfortunately, improved efficacy over conventional lighting is not yet one of the advantages of commercially available fiberoptic systems. The following example illustrates the present situation: A conventional MR-16 Track lighting system using four 50-watt light sources would consume 200 watts (lamps) and 40 watts (transformer power supply) while delivering about 600×4 (or 2400) lumens, for an overall delivered system efficacy of about 10 lumens per watt. State of the art 150-watt metal halide fiberoptic systems might deliver 363 lumens in each of four remote points (e.g., 3 meters) consuming 150 watts (lamp) and 60 watts (power supply and fan) for total efficacy of about 7 lumens per watt.

Because of increased international concern over reduction in energy usage—and thus the desire to foster the use of energy efficient lighting—as well as the practical concern of lowering operating costs, it would be desirable for fiberoptic systems to achieve increased efficiency over conventional directional lighting sources. This should be possible, in principle, since metal halide light sources now commonly in use in fiberoptic applications typically have four times the efficiency of conventional halogen light sources. The inherent efficiency gain in using a metal halide light source, however, is lost in the inefficiencies of conventional imaging collection (e.g., elliptical reflector) and distribution approaches (e.g., bundled fibers) used in the architecture of such systems.

SUMMARY OF THE INVENTION

An exemplary embodiment of the invention comprises an efficient system for directing light, which includes a light source and a generally tubular, hollow coupling device with an interior light-reflective surface for receiving light from the source at an inlet and transmitting it as a generally diverging beam through an outlet. The coupling device is shaped in accordance with non-imaging optics and increases in cross sectional area from inlet to outlet in such manner as to reduce the angle of light reflected from the surface as it passes through the device. A thermal-isolating region has an inlet positioned in proximity to an outlet of the coupling device and has an outlet for passing light to an optical member. An arrangement for splitting the light from the outlet of the thermal-isolating region comprises a plurality of light guides. Each light guide includes an inlet end for receiving light from the thermal-isolating region and an outlet end for directing light to a remote location. The inlet ends are substantially coplanar with each other and form a substantially solid shape. The coupling device and thermal-isolating region are shaped so as to distribute a respective, substantial (i.e., useful) amount of light to each of the plurality of light guides.

The foregoing system typically achieves a high degree of efficacy (e.g., 30 lumens per watt) while being compact.

DETAILED DESCRIPTION OF THE INVENTION

Figure 1:
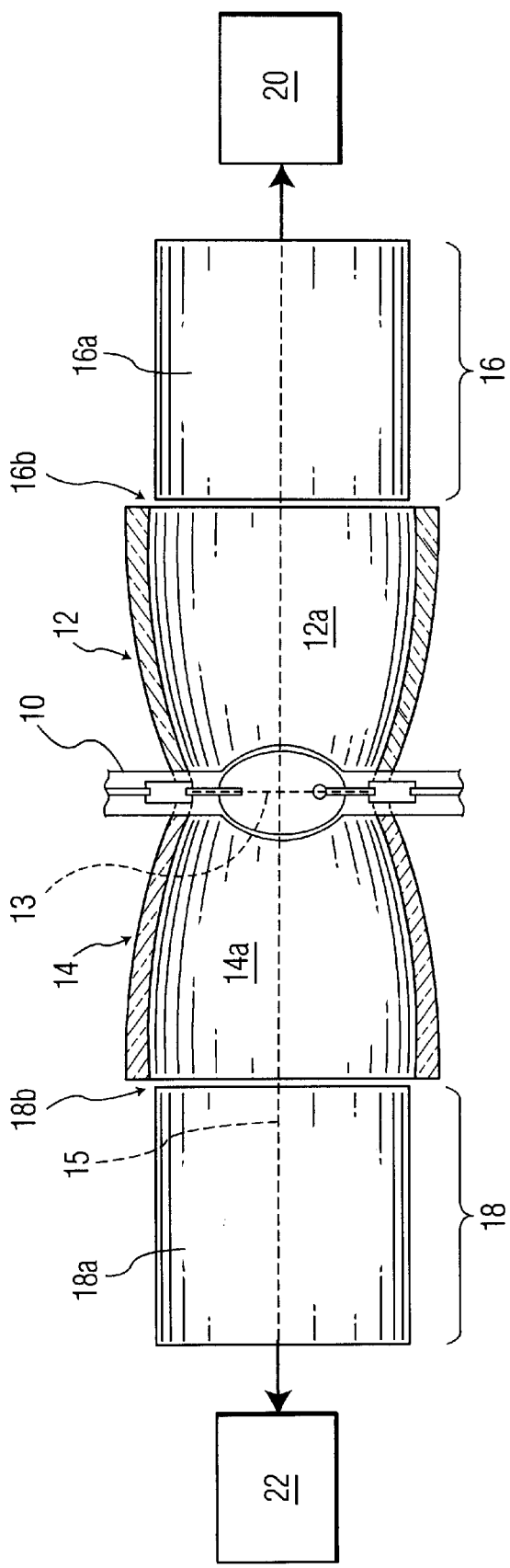
FIG. 1 is a side plan view, partially in block form, of a fiberoptic lighting system according to the invention.

FIG. 1 shows a fiberoptic lighting system according to the invention. The lighting system employs a light source 10 and one or more light coupling devices 12 and 14. Light source 10 may be a metal halide lamp as shown, or a filament-type halogen lamp, or an electrodeless lamp, by way of example.

Each of coupling devices 12 and 14 is generally tubular and has a respective, interior light-reflecting surface 12a or 14a for receiving light at an inet end, nearest the light source, and for transmitting it to an outlet end. The coupling devices may adjoin each other at boundary 13, with divergence to accommodate the upper and lower ends of light source 10. Each coupling device increases in cross-sectional area from inlet to outlet in such manner as to reduce the angle of light reflected from its interior surface as it passes through the device, while transmitting it as a generally diverging light beam through the outlet. By "generally diverging" is meant that a substantial number of light rays diverge from main axis 15 of light propagation, although some rays may be parallel to the axis. Preferably, substantially all cross-sectional segments of surfaces 12a and 14a orthogonal to main axis 15 substantially conform to a compound parabolic collector (CPC) shape. A CPC is a specific form of an angle-to-area converter, as described in detail in, for instance, W. T. Welford and R. Winston, High Collection Nonimaging Optics, New York: Academic Press, Inc. (1989), chapter 4 (pp. 53–76).

Traditionally, reflectors (not shown) control light from light sources in a so-called "imaging" method. Elliptical reflectors, for example, image the light source, positioned at a first focus of the reflector, onto a second focus. The controlled light converges from the surface of the reflector to the second focus as the light exits the reflector. Parabolic reflectors are another example of optics using imaging. In a parabolic reflector, the controlled light is collimated so that light rays exit in a generally parallel fashion. In contrast, the coupler of the present invention uses "non-imaging" optics, and, in preferred embodiments, realizes small size and superior light-mixing properties possible with such optics. As the light leaves a non-imaging collector (e.g., coupling device 12 or 14), most of the light is controlled so as to be generally diverging at a directionally useful angle (typically up to 35 degrees) as it leaves the reflector. This is an important aspect of a lighting system since the light is most highly concentrated at the exit of the non-imaging collector (e.g., coupling device 12 or 14). In contrast, in an elliptical system the light is most highly concentrated at the second focus. For a parabolic system, the light concentration is practically the same wherever it is collected. Although the light emitted by a parabolic system may have a high angular uniformity, its imaging quality typically precludes high spatial uniformity in light intensity (and color as well for discharge sources).

Light rays (not shown) passing through coupling devices 12 and 14 are respectively received by thermal-isolating regions 16 and 18 before reaching the diagrammatically shown fiberoptic splitting arrangements 20 and 22 for directing the light to desired locations. Thermal-isolating regions may comprise generally tubular rods 16a and 18a of quartz, by way of example, and air gaps 16b and 18b.

Figure 2:
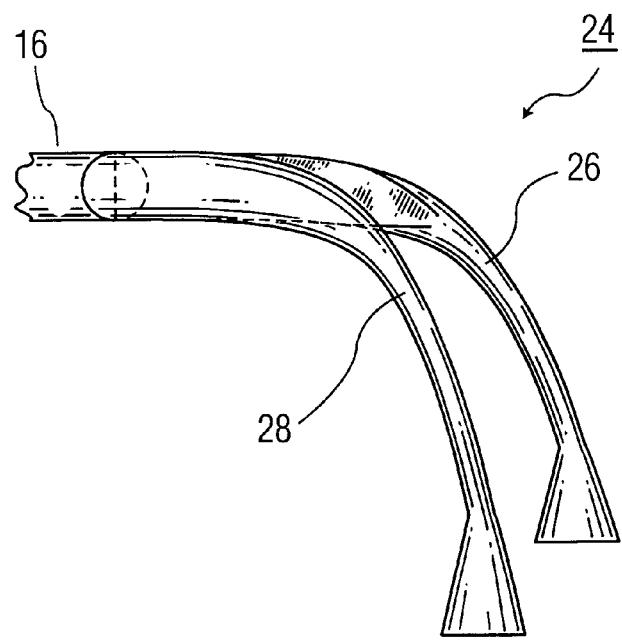
FIG. 2 is a perspective view of a fiberoptic arrangement for efficiently splitting light from a thermal-isolating region.

Fiberoptic arrangement 20 or 22 (FIG. 1) may be realized, by way of example, as arrangement 24 shown in FIG. 2. Arrangement 24 comprises two light guides 26 and 28 that may be symmetrical with each other along a main direction of light propagation. The inlets of the guides are preferably aligned with the outlet of the thermal-isolating region about a main axis (not shown) of light propagation. The light guides are preferably flexible. For protection against combustion as required by various building codes, one or more light guides (e.g., 26 and 28, FIG. 2) can be sheathed with aluminum or other fire-resistant material.

Figure 3:
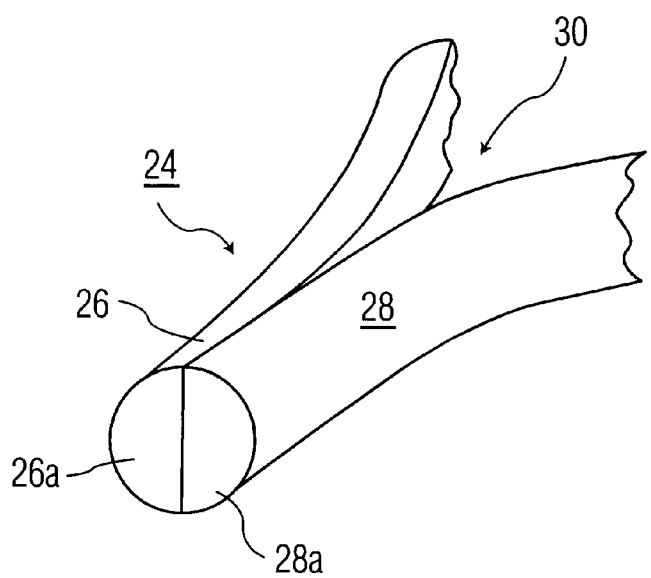
FIG. 3 is a perspective view of the fiberoptic arrangement shown in FIG. 2, partially cut away.

FIG. 3 shows details of inlet ends 26a and 28a of light guides 26 and 28. Preferably, these ends are substantially coplanar with each other and form a substantially solid shape (e.g., generally circular) for receiving light from thermal-isolating region 16 (FIG. 2). By including separate light guides, arrangement 24 avoids the difficulty of making a properly formed V-shape 30 where the light guides separate from each other where the light guides are integrally formed with each other.

Figure 4:
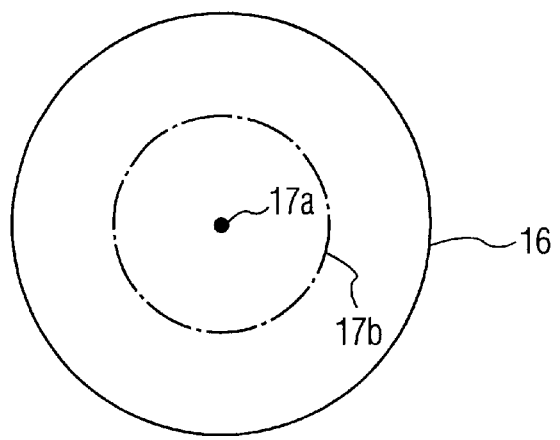
FIG. 4 is an end view of thermal-isolating region of FIG. 3 for illustrating considerable uniformity of light intensity produced with the coupling devices of FIG. 1.

Splitting arrangement 24 can efficiently and reliably split light between light guides 26 and 28 owing to considerable uniformity of light intensity provided by coupling devices 12 and 14 (FIG. 1). FIG. 4 shows an outlet end of thermal-isolating region 16, with a center 17a. At half radius 17b from the center, the light intensity (1) is at least about 60 percent of the maximum light intensity and (2) may reach upwards of 75 percent; (3) is at least about 60 percent of the light intensity at the center; (4) is typically greater than the average light intensity across the entire outlet of the thermal-isolating region; and (5) typically is symmetrically distributed about the center. Further, the uniformity of light intensity is independent of the length of thermal-isolating region 16.

In contrast, the light intensity for a light system (not shown) using a conventional elliptical reflector at half radius from a beam of light is typically no greater than about 50 percent of the maximum light intensity. Further, the point of maximum intensity is often displaced from the center of the beam in the conventional arrangement due to assembly tolerances. Additionally, non-uniformity in light intensity can arise due to focusing and defocusing that may alternately occur along the length of a thermal-isolating region such as quartz (not shown) used with the conventional reflector. Although very careful selection of the length of such region (which adds another manufacturing tolerance difficulty) may reduce such non-uniformity, it is often difficult to eliminate. In addition to precluding reliable light-splitting, such non-uniformity may cause excessive, localized heat that can damage a plastic light guide.

Figure 5A:
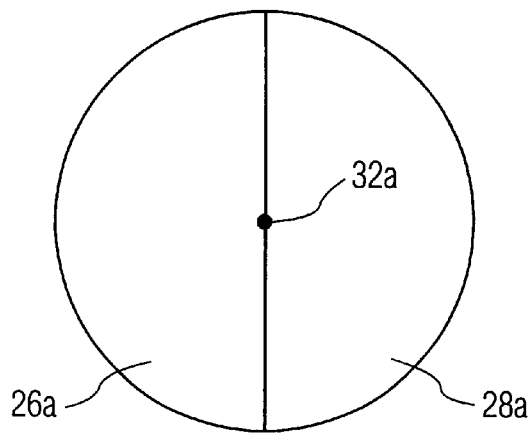
FIGS. 5A–5D are plan views of inlet ends of light guides.
Figure 5B:
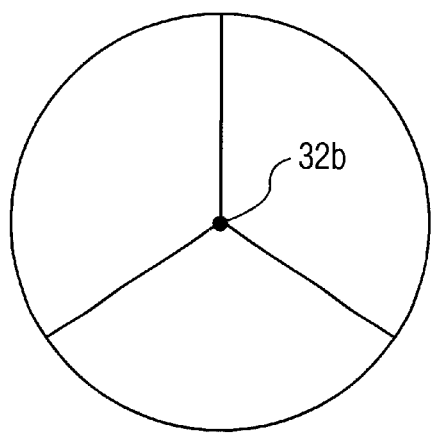

The considerable uniformity of light intensity allows splitting arrangement 24 (FIG. 3) to efficiently and reliably split light into light guides 26 and 28. FIGS. 5A–5D show preferred shapes of inlet ends to light guides for achieving a reliable split of light among the guides. All shapes form a substantially solid shape and preferably cover at least about 90 percent of the outlet of the thermal-isolating region (FIG. 2). FIG. 5A shows above-described inlet ends 26a and 28a arranged symmetrically about center 32a of the generally circular (e.g., oval or circular) shape formed. A respective perimeter portion of each light guide substantially coincides with center 32a. The same is true for the 3, 4 and 6 light guides shown in FIGS. 5B, 5C and 5D with respect to centers 32b, 32c and 32d. This tends to assure that the light received by each light guide is at least substantially proportional to the ratio of its inlet area to the combined areas of the light guides.

The inlets shown in FIG. 5A join each other at abutting planes. The inlets of FIG. 5A each have a cross section that is substantially one-half of a substantially solid shape; the inlets of FIG. 5B, one-third of a substantially solid shape; the inlets of FIG. 5C, one-fourth of a substantially solid shape; and the inlets of FIG. 5D, one-sixth of a substantially solid shape.

Preferably, the light guides of FIGS. 5A–5D are substantially arranged symmetrically about the respective centers, with the light guides covering more than approximately 90 percent of the outlet of the thermal-isolating region (e.g., 16, FIG. 2). Preferably, the inlet areas of the light guides for each of FIGS. 5A–5D are substantially the same to provide substantially equal light.

The inlets shown in FIGS. 5A–5D could be individually clad with a protective covering, and each inlet and associated light guide could be hollow.

Figure 5C:
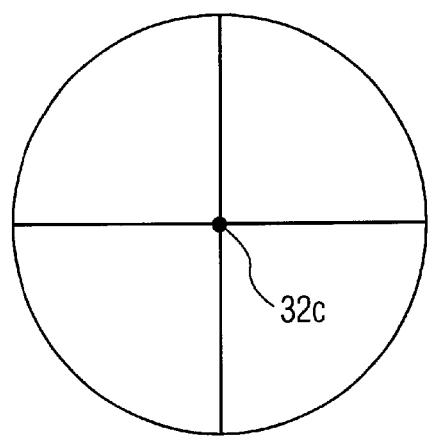
Figure 5D:
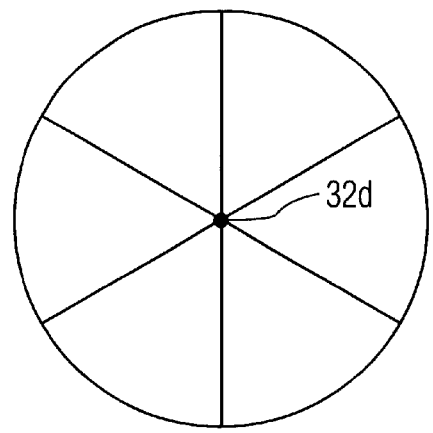
Figure 6:
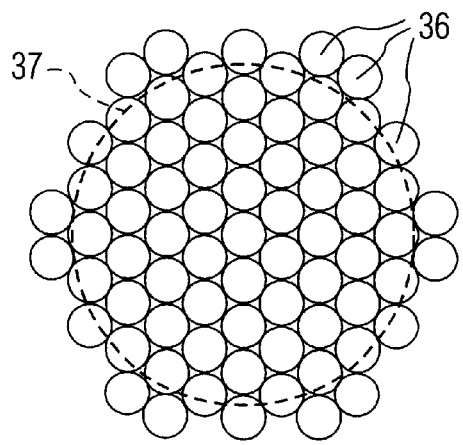
FIG. 6 is an end view of a prior art arrangement of a bundle of round fibers.

The preferred inlet shapes of FIGS. 5A–5D (and obvious variations) cover more area of the outlet of a thermal-isolating region than would occur through the use of a bundle of round fibers. FIG. 6 shows a prior art bundle 36 of round fibers assumed to be without individual claddings, with a thermal-isolating region 37 shown in dashed lines. The voids between the fibers prevent the fibers from covering more than about $(\sqrt{3}*\Pi)/6$ (i.e., about 90 percent) of the outlet of a thermal-isolating region. The voids likewise limit the amount of light that can be received from a thermal-isolating region. In practical systems, the cladding further limits the amount of light that can be received. Accordingly, the preferred shapes (and obvious variations) can receive more light than can bundle 36 (FIG. 6), in some cases receiving substantially all the light from the thermal-isolating region.

Figure 7:
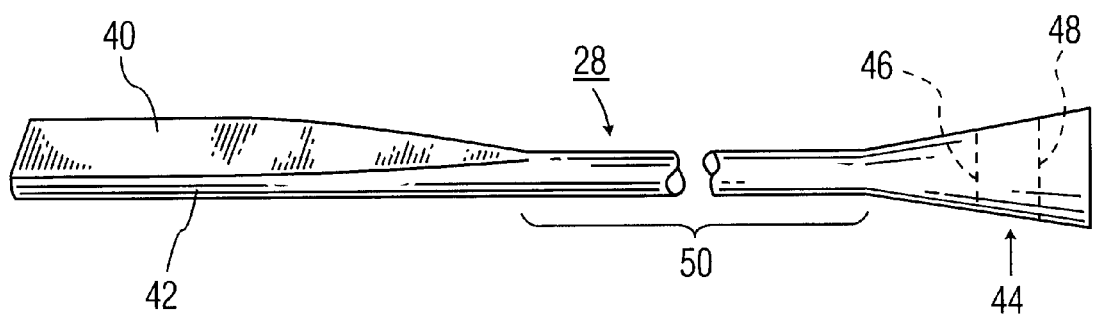
FIG. 7 is a side plan view of light guide 28 of FIG. 2.

FIG. 7 shows a preferred shape for light guide 28 (FIG. 2). The left-shown inlet end has a substantially flat surface 40 and a surface 42 that is half of a generally round (e.g., oval or round) shape. The right-shown outlet end tapers upwardly in cross-sectional area in the main direction of light propagation so as to reduce the angular distribution of light passed therethrough. The tapering preferably occurs in such manner that successively greater angular distributions of light can be selected by respectively trimming away successively greater axial portions of the outlet end. For instance, trimming away the right-most axial portion up to boundary 46 yields a greater angular distribution than trimming to boundary 48.

A central region 50 (FIG. 7), between the inlet and outlet ends, is substantially smaller in cross section than the ends. The central region is thus easier to bend than the inlet and outlet ends of the light guide.

Preferably, the cross section of the light guide of FIG. 7 changes shape smoothly from having a substantially straight side an its inlet end, to generally circular at a point distant from its inlet end. This maximizes light propagation efficiency. By "smoothly" is meant that the cross section at any point along the main direction of light propagation transitions to the next point without any substantial discontinuities.

Figure 8:
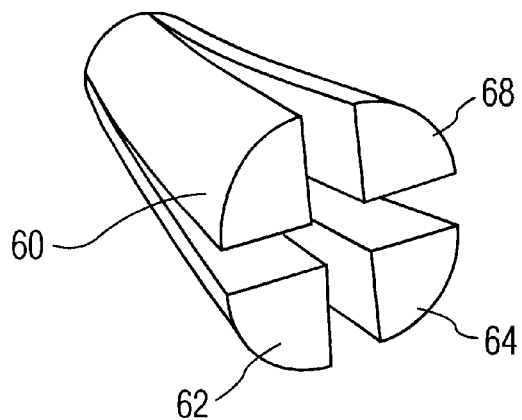
FIG. 8 is a perspective view of a plurality of light guides according to a different embodiment of the invention.

The shape of the light guide of FIG. 7 achieves high efficiency as well as a high preservation of the brightness of the light. Other shapes will achieve comparable efficiency although with less brightness, such as shown in FIG. 8. As shown in that figure, the entire cross sections of light guides 60, 62, 64 and 68 each comprise a fraction (i.e., one-fourth) of a substantially solid shape such as generally circular (as shown) along a main direction of light propagation. At the left-shown inlet ends, the inlets would appear as shown in FIG. 5C. The right-shown outlet ends diverge from each other so as to respectively direct light to different locations.

Figure 9:
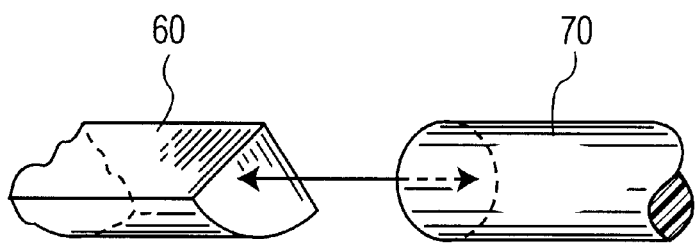
FIG. 9 is a perspective, exploded view of a light guide with a straight side and a receiving light guide of round cross section, each light guide being partially cut away.
Figure 10:
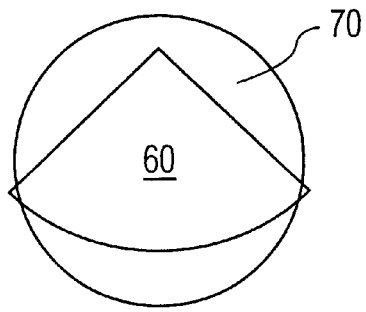
FIG. 10 is a simplified view of the two light guides of FIG. 9 placed against each other.

FIG. 9 shows the coupling of light guide 60 (FIG. 8), having a cross section of one-fourth of generally round, to a light guide 70, having a round cross section. Round cross-sectioned light guides are typically used for distributing light up to considerable distances. Preferably the perimeter of the inlet end of light guide 70 substantially coincides with the perimeter of the outlet of light guide 60, as shown in FIG. 10, although it can be larger or smaller without great detriment.

Figure 11:
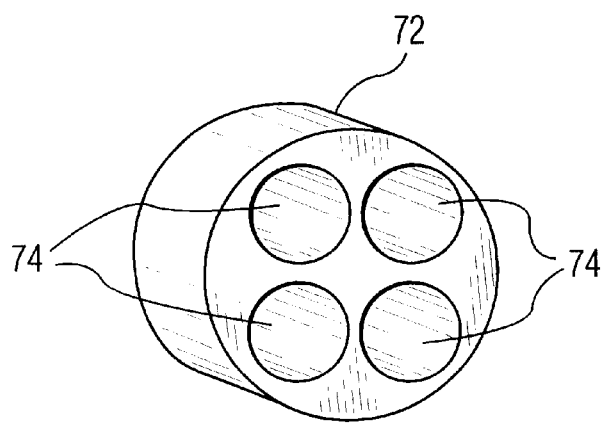
FIG. 11 is a perspective view of a collar holding the different light guides of FIG. 9.

Light guide 60 (FIG. 9) may be held adjacent to light guide 70 with a collar 72 shown in FIG. 11. Each of holes 74 may receive a light guide with a substantially straight side (e.g., 70) in its left-shown side and a light guide with a generally round cross section (e.g., 70) in its right-shown side. Collar 72 can accommodate the four light guides shown in FIG. 8, for instance. Collar 72 may be made of aluminum, for instance.

Figure 12:
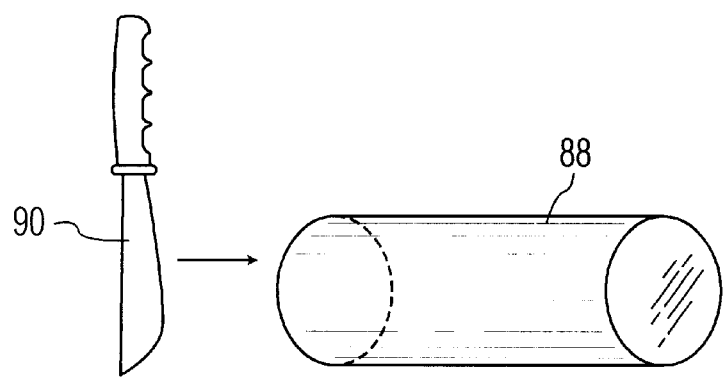
FIG. 12 is a perspective view illustrating a preferred method of making a light-splitting arrangement for use in the system of FIG. 1.

FIG. 12 illustrates a preferred method of making a light-splitting arrangement having light guides as shown, for instance, in FIGS. 5A–5D. An elongated, generally cylindrical piece of flexible acrylic or other fiberoptic material 88, preferably warmed above 60 C. to improve its ability to be cut, is provided. Suitable fiberoptic materials are described in U.S. Pat. Nos. 5,485,541 and 5,406,641. The elongated material 88 is then cut along its longitudinal direction by a cutting blade 90, such as a knife or razor blade (e.g., part no. 62-0165 sold under the trademark GEM, registered in the U.S. Patent and Trademark Office), preferably coated with TEFLON material. Alternatively, other cutting means such as a laser can be used.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An efficient system for directing light, comprising:
   a) a light source having a bulbous region;
   b) a generally tubular, hollow coupling device with an interior light-reflective surface for receiving light from the source at an inlet and transmitting it as a generally diverging light beam through an outlet; the coupling device being shaped in accordance with non-imaging optics and increasing in cross sectional area from inlet to outlet in such manner as to reduce the angle of light reflected from the surface as it passes through the device;
   c) substantially the entire cross section of the device along a main axis of light propagation being substantially curved; the cross-sectional area of the bulbous region filling the majority of the planar region which is radially bounded by the inlet end of the light-reflective curved surface of the device;
   d) the bulbous region being fixed in position relative to the coupling device;
   d a thermal-isolating region having an inlet positioned in proximity to an outlet of the coupling device and having an outlet for passing light to an optical member; and
   e) an arrangement for splitting the light from the outlet of the thermal-isolating region, comprising a plurality of light guides, each of which includes:
      i) an inlet end for receiving light from the thermal-isolating region and an outlet end for directing light to a remote location; and
      ii) the inlet ends being substantially coplanar with each other and forming a substantially solid shape;
   f) the coupling device and thermal-isolating region being shaped so as to distribute a respective, substantial amount of light to each of the plurality of light guides.

2. The system of claim 1, wherein:
   a) the light guides are not fused together; and
   b) the inlet ends are shaped so as to collectively receive substantially all light from the thermal-isolating region.

3. The system of claim 1, wherein the coupling device is shaped so that light intensity at half radius from the center of the outlet of the coupling device is at least about 60 percent of the maximum light intensity.

4. The system of claim 1, wherein the coupling device is shaped so that light intensity at half radius from the center of the outlet of the coupling device is at least about 60 percent of the light intensity at the center of the outlet.

5. The system of claim 1, wherein the light-receiving portions of the light guides are so shaped as to substantially eliminate the voids between light guides associated with a bundle of round fibers.

6. The system of claim 1, wherein the light-receiving portions of the light guides are so shaped as to collectively cover more of the outlet of the thermal-isolating region than can be covered by a bundle of round fibers.

7. The system of claim 6, wherein:
   a) the at least one of the light guides comprises an integral piece of material;
   b) a mid-portion of the foregoing at least one light guide is substantially smaller in cross section than its inlet and outlet ends; and c) the cross section of the at least one of the light guides at any point along the main direction of light propagation transitioning to the next point without any substantial discontinuities.

8. The system of claim 7, wherein a central region of the at least one of the light guides can be bent without substantial loss of light-propagation efficiency.

9. The system of claim 8, wherein:
a) the outlet end tapers upwardly in cross-sectional area in the main direction of light propagation so as to reduce the angular distribution of light passed therethrough;
b) the tapering occurring in such manner that successively greater angular distributions of light output from the light guide can be selected by respectively trimming away successively greater axial portions of the outlet end.

10. The system of claim 3, wherein the amount of light that each light guide receives is substantially proportional to the ratio of its cross-sectional inlet area to the combined cross-sectional inlet areas of the plurality of light guides.

11. The system of claim 10, wherein:
a) the plurality of light guides are not fused together and are substantially arranged symmetrically about a center point of the substantially solid shape and cover more than approximately 90 percent of the outlet of the thermal-isolating region; and
b) a perimeter portion of each of the light guides substantially coincides with the center point.

12. The system of claim 11, wherein the plurality consists of two.

13. The system of claim 11, wherein the plurality consists of three.

14. The system of claim 11, wherein the plurality consists of four.

15. The system of claim 14, wherein the inlets to the plurality of light guides are substantially equal in cross-sectional area.

16. The system of claim 11, wherein the plurality consists of six.

17. The system of claim 16, wherein the inlets to the plurality of light guides are substantially equal in cross-sectional area.

18. The system of claim 1, wherein a respective perimeter portion of each of the plurality of light guides substantially coincides with a center point of the outlet of the thermal-isolating region, with respect to radial placement from a main axis of light propagation.

19. The system of claim 1, wherein substantially the entire cross section of one of the plurality of light guides perpendicular to a main direction of light propagation has at least one substantially straight side.

20. The system of claim 19, further comprising:
a) a generally circular light guide positioned adjacent to an outlet of the one of the light guides so as to receive light from such light guide;
b) an inlet to the generally circular light guide substantially covering the entire outlet of the one light guide.

21. The system of claim 1, wherein the cross-section of at least one light guide smoothly changes shape from having a substantially straight side on a cross section perpendicular to a main axis of light propagation at its inlet end to generally circular at a point distant from the inlet end.

22. A method of making a light-splitting system, comprising the steps of:
a) providing an integral piece of flexible fiberoptic material; and
b) making at least one cut in the piece along its longitudinal direction so as to produce a plurality of light guides portions having inlet ends that may be placed substantially coplanar with each other with their original longitudinal positions relative to each other remaining substantially intact so as to form a substantially solid shape.

23. The method of claim 22, wherein the step of providing an integral piece comprises providing a generally cylindrical piece of acrylic material warmed above 60 C.

24. The system of claim 1, wherein:
a) the inlet of the coupling device has a recess extending along a main direction of light propagation;
b) the recess being shaped to allow passage therethrough of at least a portion of a longitudinal end of the light source so that one longitudinal section of the end is exposed to an outside surface of the coupling device and an adjacent longitudinal section is not exposed to such outside surface.

25. The system of claim 1, wherein the light-receiving portions of the light guides are not fused together and are so shaped as to collectively receive more than about 90 percent of the light from the outlet of the thermal-isolating region.

* * * * *